United States Patent
Uesugi et al.

(10) Patent No.: US 9,512,924 B2
(45) Date of Patent: Dec. 6, 2016

(54) SEALING STRUCTURE

(75) Inventors: Yasuji Uesugi, Wakayama (JP); Atsushi Hosokawa, Wakayama (JP)

(73) Assignee: MITSUBISHI CABLE INDUSTRIES, LTD., Tokyo (JP)

( * ) Notice: Subject to any disclaimer, the term of this patent is extended or adjusted under 35 U.S.C. 154(b) by 1 day.

(21) Appl. No.: 13/522,350

(22) PCT Filed: Jan. 11, 2011

(86) PCT No.: PCT/JP2011/000070
§ 371 (c)(1),
(2), (4) Date: Jul. 16, 2012

(87) PCT Pub. No.: WO2011/086887
PCT Pub. Date: Jul. 21, 2011

(65) Prior Publication Data
US 2012/0286478 A1   Nov. 15, 2012

(30) Foreign Application Priority Data

Jan. 18, 2010  (JP) ................................. 2010-008145
Dec. 27, 2010  (JP) ................................. 2010-289197

(51) Int. Cl.
| F16J 15/24 | (2006.01) |
| F16J 15/56 | (2006.01) |
| F16J 15/16 | (2006.01) |
| F16J 15/32 | (2016.01) |

(52) U.S. Cl.
CPC ............... *F16J 15/56* (2013.01); *F16J 15/166* (2013.01); *F16J 15/322* (2013.01); *F16J 15/3236* (2013.01)

(58) Field of Classification Search
CPC ....... F16J 15/166; F16J 15/322; F16J 15/3236
See application file for complete search history.

(56) References Cited

U.S. PATENT DOCUMENTS

| 4,053,166 | A | * | 10/1977 | Domkowski | 277/558 |
| 4,190,259 | A | * | 2/1980 | Zitting | 277/584 |
| 4,566,702 | A | * | 1/1986 | Traub | 277/589 |
| 4,592,558 | A | * | 6/1986 | Hopkins | 277/572 |
| 5,163,692 | A | * | 11/1992 | Schofield et al. | 277/436 |
| 5,346,230 | A | * | 9/1994 | Schumacher et al. | 277/551 |
| 7,341,258 | B2 | * | 3/2008 | Holt et al. | 277/584 |

FOREIGN PATENT DOCUMENTS

| JP | 59-003065 U | 1/1984 |
| JP | 62-093463 U | 6/1987 |
| JP | 11-325255 A | 11/1999 |
| JP | 2005-337440 A | 12/2005 |
| JP | 2007-139055 A | 6/2007 |

OTHER PUBLICATIONS

International Search Report for corresponding International Application No. PCT/JP2011/000070 mailed Mar. 29, 2011.
Form PCT/ISA/237 for corresponding International Application No. PCT/JP2011/000070 dated Mar. 29, 2011.
English translation of the International Preliminary Report on Patentability corresponding International Application No. PCT/JP2011/000070 dated Aug. 7, 2012.

* cited by examiner

*Primary Examiner* — Kristina Fulton
*Assistant Examiner* — Thomas Neubauer
(74) *Attorney, Agent, or Firm* — Renner, Otto, Boisselle & Sklar, LLP.

(57) ABSTRACT

An inner peripheral surface (10C) of an elastic seal (10) having a U-shaped cross section and made of rubber is supported by a guide ring (20) having a flat cross-sectional shape and made of synthetic resin.

10 Claims, 13 Drawing Sheets

SEALING STRUCTURE

TECHNICAL FIELD

The present invention relates to sealing structures and double sealing structures using the same.

BACKGROUND ART

Recently, the following is strongly demanded of, e.g., a hydraulic reciprocating sealing structure: (i) to allow contributions to the reduced size of devices and increased pressure; and (ii) to reduce the number of parts by forming a ring-shaped groove into which a seal is inserted.

While in order to meet the demand (i), a sealing structure requires size reduction of a seal itself, an increase in the seal rigidity, and complication of the seal shape, these requirements result in a significant decrease in workability (ease of seal insertion) in inserting a seal into a ring-shaped seal groove (recess), and thus, the sealing structure cannot meet the demand (ii).

Furthermore, in order to meet the demand (i), a double sealing structure in which two seal grooves (recesses) are formed, and which includes a seal inserted into each of the seal grooves is employed as a sealing structure which can be used at high pressure. For example, in the invention described in PATENT DOCUMENT 1, a double sealing structure has been proposed in which a U-shaped first seal 46 and a U-shaped second seal 47 both made of rubber are inserted into two seal grooves (recesses) 40 and 41, respectively, as illustrated in FIG. 13, and a backup ring 42 made of synthetic resin is fitted to the back surface 47a of the second seal 47.

The two ring-shaped seal grooves 40 and 41 are formed directly in a cylinder head 44 through which a piston rod 43 is reciprocatably inserted. The first seal 46 and the second seal 47 are made of elastic rubber to ensure easy insertion of the seals, and the cross-sectional area of the backup ring 42 is set to an area as small as possible, thereby allowing a thin receiver piece (deformation prevention piece) 42A to extend from an end portion of the backup ring 42 located near the inside diameter thereof toward a fluid storage chamber 45.

CITATION LIST

Patent Document

PATENT DOCUMENT 1: Japanese Patent Publication No. 2005-337440

SUMMARY OF THE INVENTION

In the above-described sealing structure illustrated in FIG. 13, under pressures P illustrated in FIG. 14, the receiver piece 42A of the backup ring 42 prevents the second seal 47 made of rubber from entering a space 48B. However, the first seal 46 enters a space 48A, and thus, engagement 49 of the first seal 46 in the space 48A occurs, thereby locally breaking the first seal 46.

Furthermore, with an increase in the pressures P, the first seal 46 and the second seal 47 made of rubber which tends to be deformed are pressed against the outer peripheral surface of the piston rod 43 with high contact pressures illustrated by arrows $f_1$ and $f_2$ as illustrated in FIG. 14, resistance to a reciprocating motion of the piston rod 43 is, therefore, excessively high, and a pressed portion of the first seal 46 and a pressed portion of the second seal 47 are excessively worn.

Therefore, the sealing structure configured as illustrated in FIGS. 13 and 14 has many significant problems, and is not practical under conditions where high pressures are used.

Here, if the first seal 46 and the second seal 47 were made of synthetic resin, the resistance to the reciprocating motion would decrease to thereby obtain a relatively favorable result, and the first seal 46 could be prevented from entering the space 48A (the engagement 49). However, such seals are inferior in sealability under low pressures, and the ease of insertion of such seals into the seal grooves 40 and 41 decreases.

An object of the present invention is to provide a sealing structure which can be inserted into a ring-shaped groove, is excellent in workability in inserting the sealing structure, is sufficiently resistant to high pressures, does not undergo deformation, such as engagement, has low resistance to friction against a reciprocating rod and excellent durability, and can exhibit sufficient sealability (hermeticity) even under low pressures. Furthermore, another object of the present invention is to provide a sealing structure which is suitable for a double sealing structure and in which back pressures do not increase.

A sealing structure of the present invention which achieves the above objects includes: an elastic seal made of rubber, and inserted into a recess formed in an inner peripheral surface of a bore through which a reciprocating rod is inserted; and a backup ring configured to support a back surface of the elastic seal. The elastic seal includes an inside diameter lip and an outside diameter lip, the sealing structure further includes a guide ring made of synthetic resin, and integrally including a thin wall portion which has a low-pressure-side end portion being in contact with the backup ring, and which is configured to support a seal inner peripheral surface of the elastic seal toward the back surface, and a projecting portion connected to the thin wall portion, fitted into a small recess formed in an axially central portion of the seal inner peripheral surface, and having a round V-shaped cross section, and under pressures, rubber in a surrounding region of a proximal portion of the inside diameter lip of the elastic seal is guided radially outward by the projecting portion.

The elastic seal may be a U seal having a U-shaped cross section.

The elastic seal may be a Y seal having a Y-shaped cross section.

The elastic seal may have a U-shaped or Y-shaped cross-section, and a small indentation may be formed near an outer circumferential surface of a proximal portion of the outside diameter lip.

The guide ring may integrally include an inclined thin piece tapered from the projecting portion to a sealed fluid side along an inner peripheral surface of the inside diameter lip of the elastic seal.

The backup ring may have an outer circumferential end surface including an inclined guide surface formed such that a diameter of the inclined guide surface increases toward a low pressure side, and under pressures, rubber forming a back proximal portion of the elastic seal may be guided radially outward and toward the low pressure side.

The recess may be ring-shaped, and the guide ring may be shaped in an endless closed ring.

A double sealing structure may include: the sealing structure of the present invention disposed toward at least one of a sealed fluid side or a low pressure side.

The sealing structure of the present invention can be easily inserted into a ring-shaped groove, has excellent workability in insertion, is compact in size, can also accommodate the conditions where high pressures are used, and exhibits sufficient sealability even under low pressures. Furthermore, the sealing structure prevents (or reduces) close contact of the elastic seal with (a pressure against) the outer peripheral surface of the reciprocating rod with an excessively high contact pressure, has low sliding resistance, and offers excellent seal durability. Moreover, the sealing structure accommodates higher pressures, is suitable also for a double sealing structure, and prevents back pressures from increasing.

BRIEF DESCRIPTION OF THE DRAWINGS

FIG. 8 are diagrams illustrating another example guide ring, in which FIG. 8(A) is a partially fragmented, perspective view of the guide ring, and FIG. 8(B) is an enlarged cross-sectional view of a principal portion of the guide ring.

FIG. 9 are diagrams illustrating still another example guide ring, in which FIG. 9(A) is a partially fragmented, perspective view of the guide ring, and FIG. 9(B) is an enlarged cross-sectional view of a principal portion of the guide ring.

FIG. 10 are diagrams illustrating yet another example guide ring, in which FIG. 10(A) is a partially fragmented, perspective view of the guide ring, and FIG. 10(B) is an enlarged cross-sectional view of a principal portion of the guide ring.

DESCRIPTION OF EMBODIMENTS

The present invention will be described hereinafter in detail based on illustrated embodiments.

Figure 1:
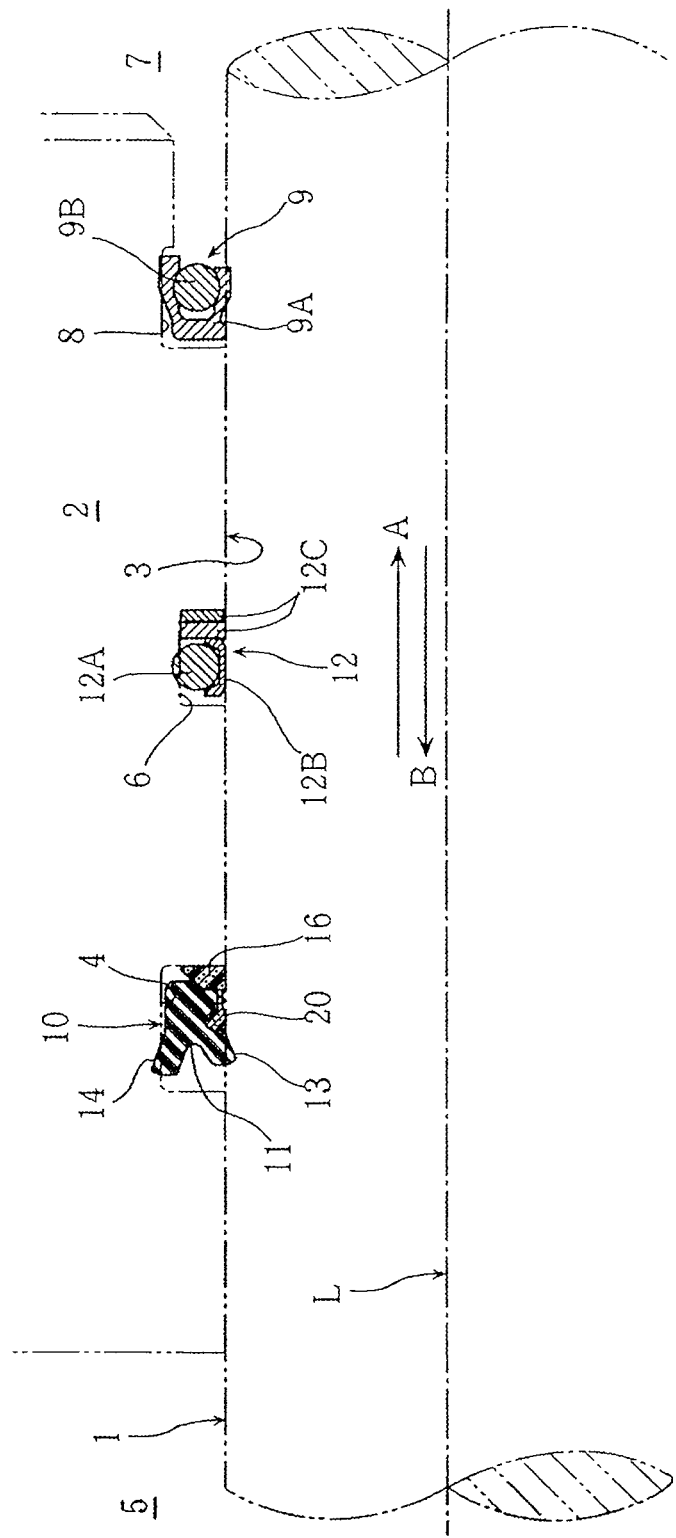
FIG. 1 is a diagram illustrating a cross section of a principal portion of a sealing structure according to an embodiment.

FIG. 1 illustrates a reciprocating sealing structure according to an embodiment of the present invention. In the sealing structure of this embodiment, the reference character 1 denotes a reciprocating rod which reciprocates as illustrated by arrows A and B, and the reference character 2 denotes a seal fitting member, such as a cylinder head. A bore 3 through which the rod 1 is inserted penetrates through the seal fitting member 2. A first recess 4, a second recess 6, and a scraper recess 8 which are individual ring-shaped seal grooves are spaced in the seal fitting member 2 in sequential order from a fluid storage chamber side (high pressure side) 5 toward an air side (low pressure side) 7 to be open to the bore 3.

The first and second recesses 4 and 6 each have a rectangular cross-sectional shape. The scraper recess 8 is open to the low pressure side 7.

A first seal, a second seal 12, and a scraper 9 are inserted into the first recess 4, the second recess 6, and the scraper recess 8, respectively.

The second seal 12 illustrated in FIG. 1 includes an O ring 12A, a cap seal 12B, and two backup rings 12C, 12C. The scraper 9 includes a scraper body 9A which is open to the low pressure side 7 and has a U-shaped cross section, and an O ring 9B inserted into an opening groove of the scraper body 9A. FIG. 1 illustrates the first seal, the second seal 12, and the scraper 9 before insertion of the seals and the scraper 9, and the virtual locations of the reciprocating rod 1 and the fitting member 2 are illustrated by the chain double-dashed line in FIG. 1.

Figure 2:
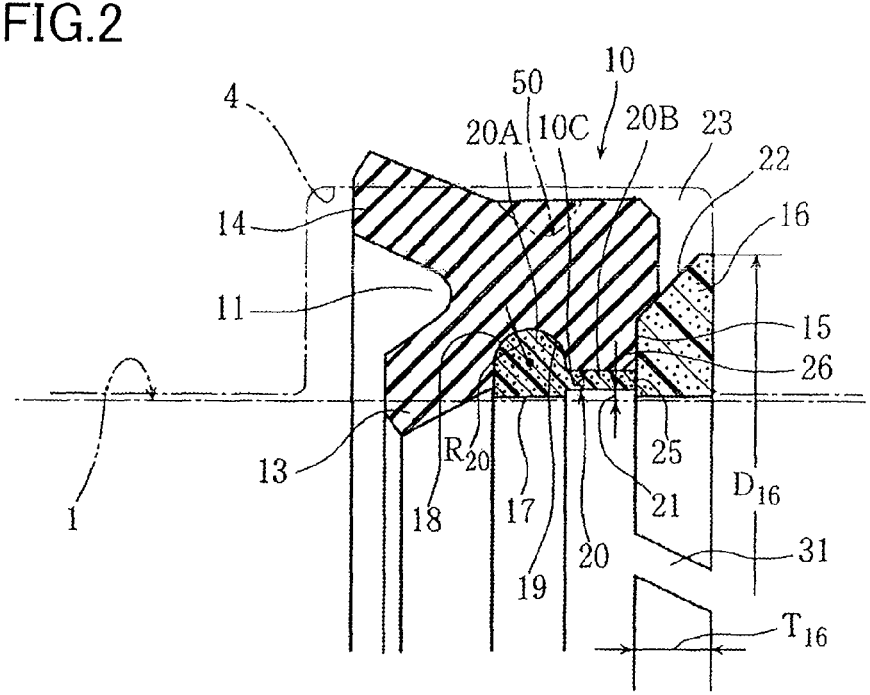
FIG. 2 is an enlarged cross-sectional view illustrating a principal portion of a first seal before insertion of the first seal.
Figure 3:
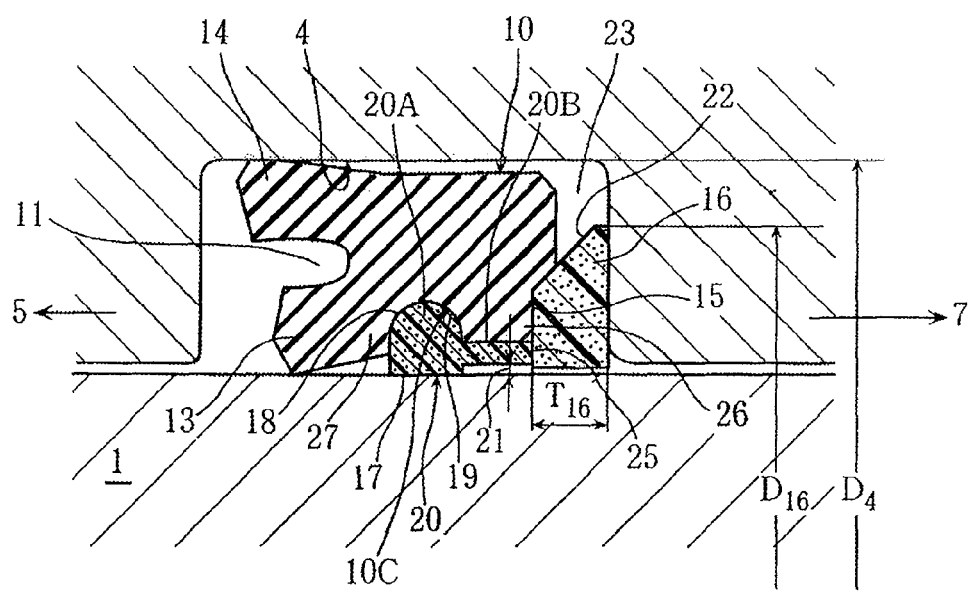
FIG. 3 is an enlarged cross-sectional view illustrating a principal portion of the sealing structure according to the embodiment under conditions where the sealing structure does not receive pressures.

A sealing structure according to the present invention is used as the first seal toward the high pressure side 5. The reference character 10 denotes an elastic seal made of rubber. The elastic seal 10 is a U seal having a U-shaped cross section in FIGS. 1-5. The elastic seal 10 is preferably made of rubber, such as EPDM, fluororubber, or nitrile rubber. The elastic seal 10 includes an inside diameter lip 13 and an outside diameter lip 14. The elastic seal 10 is configured such that a U-shaped groove 11 formed by both of the lips 13 and 14 is open to the high pressure side 5. As illustrated in FIG. 1, FIG. 2 which is an enlarged view of FIG. 1, and FIG. 3 illustrating the inserted elastic seal 10 to which pressures are not applied, the back surface 15 of the elastic seal 10 is supported by the backup ring 16 made of synthetic resin, such as PTFE, and a region including a central portion of the inner peripheral surface of the elastic seal 10 and a portion of the elastic seal 10 located near the back surface 15 is supported by a guide ring 20 made of synthetic resin, such as PTFE.

Figure 4:
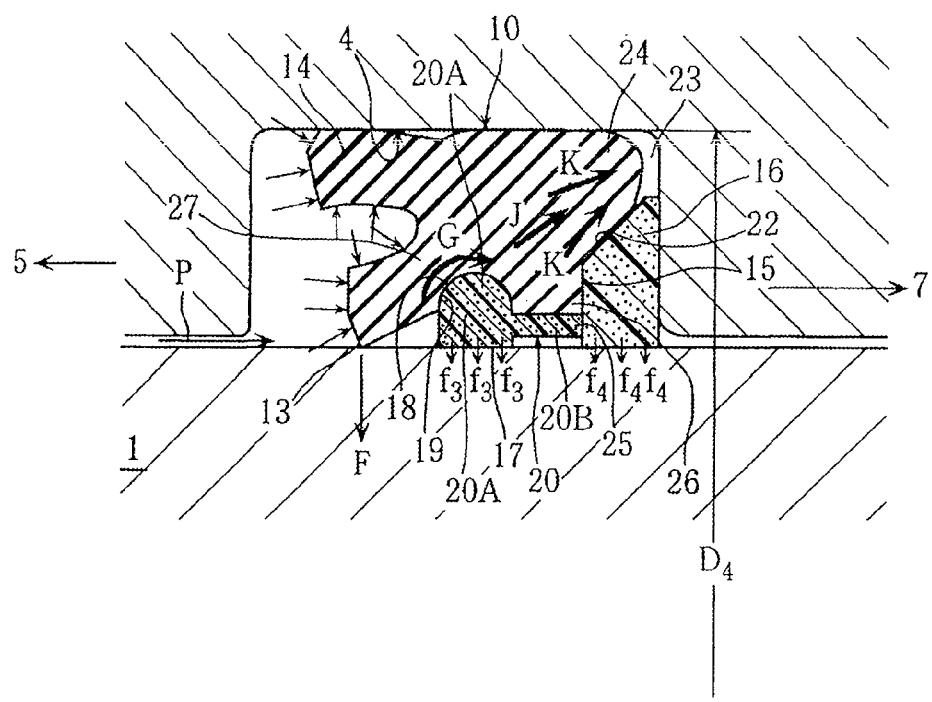
FIG. 4 is an enlarged cross-sectional view illustrating a principal portion of the sealing structure according to the embodiment under pressures.
Figure 5:
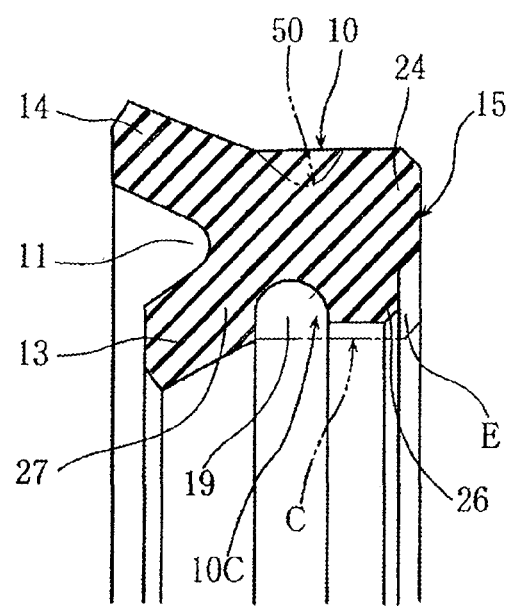
FIG. 5 is an enlarged cross-sectional view of a principal portion of an example elastic seal.
Figure 6:
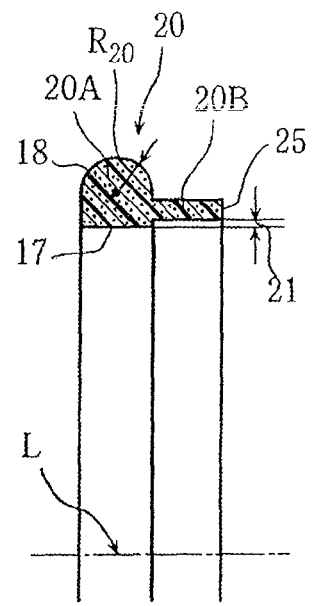
FIG. 6 is an enlarged cross-sectional view of a principal portion of an example guide ring.

As illustrated in FIGS. 1-3, FIG. 4 illustrating the sealing structure under the pressures P, and FIGS. 5 and 6 separately illustrating pieces into which the sealing structure is disassembled, the guide ring 20 integrally includes a projecting portion 20A having a round V-shaped (semi-circular or semi-elliptical) cross section, and a thin wall portion 20B having a linear cross-sectional shape. The guide ring 20 is shaped in an endless closed ring. The guide ring 20 has a flat cross-sectional shape in a direction parallel to the axis L, and is easily inserted into the ring-shaped recess 4. The bottom surface 17 of the projecting portion 20A has a linear outline in cross section, and is in (sliding) contact with the outer peripheral surface of the rod 1, and a curved raised portion 18 of the projecting portion 20A has a predetermined small radius $R_{20}$, and is fitted into a small recess 19 in the elastic seal 10.

The thin wall portion 20B is disposed slightly radially outward from the bottom surface 17 such that a narrow space 21 having a size of about 0.05-0.20 mm is formed between the thin wall portion 20B and the rod 1. In other words, the thin wall portion 20B is formed on a side surface of the round V-shaped projecting portion 20A located toward the low pressure side 7 so as to be displaced about 0.05-0.20 mm from the bottom surface 17 in a radially outward direction and project along the axis L.

In FIG. 5, the chain double-dashed line C toward the inside diameter of the elastic seal 10 illustrates a portion of a cross-sectional profile of a typical U seal (U gasket). With reference to the chain double-dotted line C, a portion of the elastic seal 10 is cut away to form an empty space E, and the guide ring 20 is fitted into the empty space E. Furthermore, a portion of the backup ring 16 having such a shape as described below is also fitted into a portion of the empty space E.

The backup ring 16 is set to have a relatively large thickness $T_{16}$, and the outer peripheral end surface of the backup ring 16 includes an inclined guide surface 22 formed such that the diameter of the backup ring 16 gradually increases toward the low pressure side 7. Furthermore, the outside diameter $D_{16}$ of the backup ring 16 is set sufficiently smaller than the inside diameter $D_4$ of the circumferential wall of the recess 4, and thus, a space 23 (for entry of deformed rubber) as illustrated in FIGS. 2 and 3 is formed in a corner portion of the recess 4 located toward the low pressure side. With this structure, as described below, the rubber flow illustrated by an arrow K in FIG. 4 occurs under pressures, thereby allowing rubber 24 forming a back proximal portion of the elastically deformed elastic seal 10 to enter the space 23. The inclined guide surface 22 guides the rubber 24 forming the back proximal portion of the elastic seal 10 from the low pressure side in a radially outward direction under such pressure conditions as illustrated in FIG. 4.

Additionally, a low-pressure-side end portion 25 of the guide ring 20 made of synthetic resin is in contact with the backup ring 16, and the guide ring 20 supports a seal inner peripheral surface 10C of the elastic seal (U seal) 10. The conditions where the elastic seal 10 is supported will be described below. The thin wall portion 20B supports the seal inner peripheral surface 10C of the elastic seal (U seal) 10 toward the back surface 15, and, in particular, an inside corner portion 26 of the elastic seal 10 located near the back surface 15 is supported by the thin wall portion 20B and the backup ring 16. The round V-shaped projecting portion 20A of the guide ring 20 is fitted into the small recess 19 formed in an axially central portion of the seal inner peripheral surface 10C of the elastic seal 10, and the bottom surface 17 is slidably in contact with the outer peripheral surface of the rod 1, thereby preventing an axially central portion of the elastic seal 10 made of rubber from being in direct contact with the outer peripheral surface of the reciprocating rod 1, and thus, significantly reducing abrasion resistance under high pressures. Specifically, the guide ring 20 functions as a ring with low sliding resistance in the application of high pressures. In this case, the material of the guide ring 20 is preferably a low friction material, such as PTFE described above.

As illustrated by the arrow G in FIG. 4, under pressures, rubber in a surrounding region 27 of a proximal portion of the inside diameter lip 13 of the elastic seal 10 is guided radially outward by the round V-shaped projecting portion 20A.

Figure 14:
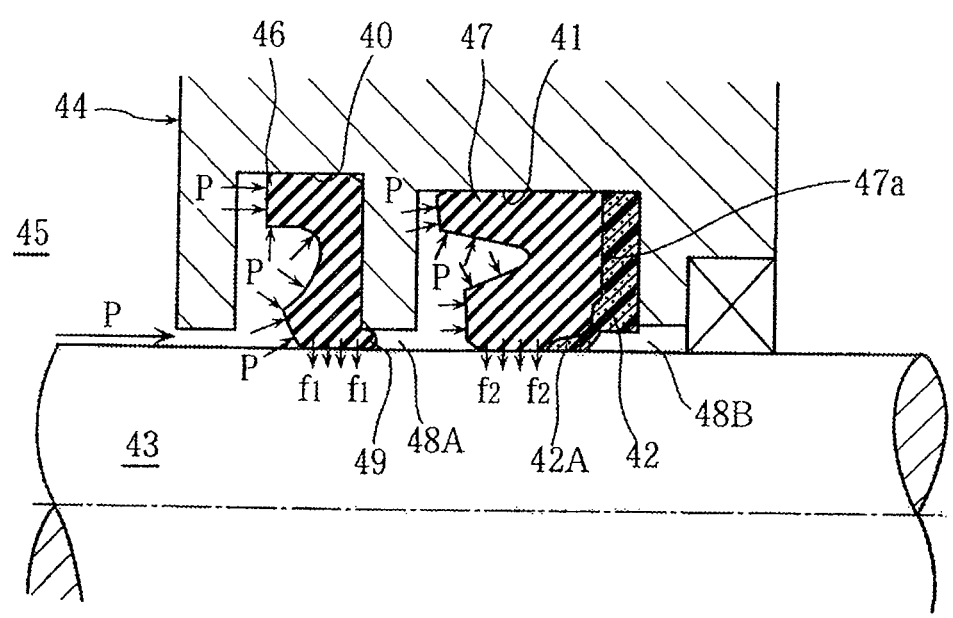
FIG. 14 is an enlarged cross-sectional view illustrating a principal portion of the sealing structure according to the conventional example under pressures.

In a conventional example illustrated in FIG. 14, seals are strongly pressed against a rod 43 as illustrated by arrows $f_1$ and $f_2$ so as to be in close contact with the rod 43, and thus, the resistance to sliding of the rod is excessively high. In contrast, in the present invention, as illustrated by the arrow G in FIG. 4, the rubber flow occurs to guide the inside diameter lip 13 radially outward, i.e., in a direction away from the rod 1, thereby reducing the pressure exerted on the rod 1 and illustrated by an arrow F and reducing the resistance to sliding of the rod. The flows of rubber as illustrated by arrows J and K in FIG. 4 are also added by the effects of, e.g., the inclined guide surface 22 of the backup ring 16 and the space 23, thereby further increasing the flow of rubber in the direction of the arrow G. In the sealing structure according to the present invention, a low sliding contact pressure from the elastic seal 10 to the rod 1 can be maintained by the above effects even in the application of high pressures (the action of the high pressures P), thereby reducing the resistance to sliding of the rod 1.

With the rubber flows illustrated by the arrows G, J, K, etc., the bottom surface 17 of the guide ring 20 and the bottom surface of the backup ring 16 are in contact with the rod 1 with the sliding contact pressures illustrated by the arrows $f_3$ and $f_4$. However, the abrasion resistance between the guide ring 20 or the backup ring 16 both made of a low friction material, such as PTFE, and the reciprocating rod 1 is low, and thus, the problem of excessively high abrasion resistance in the conventional example illustrated in FIG. 14 can be reliably solved.

When the pressures P are low (under low pressures), the elastic seal 10 provides sufficient sealability (sealing performance), because it is a rubber seal which tends to be elastically deformed.

As described above, under high pressures, the guide ring 20 significantly contributes to the low sliding resistance, and can be expected to move together with the elastic seal 10 by being fitted to the elastic seal 10, and thus, even if the guide ring 20 is small, and has low rigidity, the guide ring 20 cannot be crushed or fall off.

Incidentally, as illustrated by the chain double-dashed lines (toward the outer periphery) in FIGS. 2 and 5, a small (notch-like) indentation 50 may be preferably formed in the vicinity of a proximal portion of the outside diameter lip 14 located toward the outer periphery thereof. In other words, the elastic seal 10 may preferably have a U-shaped or Y-shaped cross section, and the small indentation 50 may be preferably formed in the vicinity of the outer peripheral surface of a proximal portion of the outside diameter lip 14.

Figure 7:
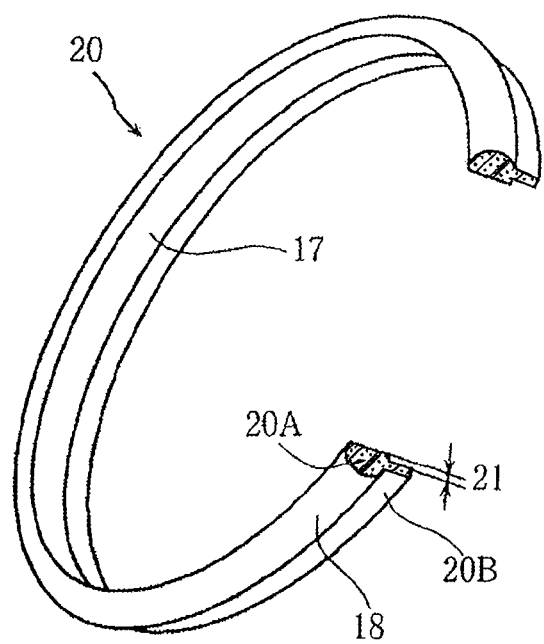
FIG. 7 is a partially fragmented, perspective view of the guide ring.

FIG. 7 is a partially fragmented, perspective view of the same example guide ring 20 as in FIGS. 6 and 2-4. A feature of the guide ring 20 is that the guide ring 20 has a recessed area (narrow space) 21, and the guide ring 20 can be expected to have lower sliding resistance. In contrast, in another example illustrated in FIGS. 8(A) and 8(B), many narrow lubricating grooves 29 are formed at regular intervals in the surface of the guide ring 20 located near the reciprocating rod 1 to extend in a direction parallel to the axis. Specifically, when the narrow lubricating grooves 29 are formed in the sliding (lower) surface 17 of the guide ring 20, hydraulic oil is stored in the narrow lubricating grooves 29, thereby further reducing the resistance to sliding of the rod 1. The narrow grooves 29 reduces the rigidity of the guide ring 20 to some extent, thereby providing easier insertion of a seal into the ring-shaped recess 4.

FIGS. 9(A), 9(B), 10(A), and 10(B) illustrate different examples of the guide ring 20. In the examples, the recessed area 21 is omitted, thereby facilitating fabrication and providing slightly greater rigidity. In the structure illustrated in FIGS. 10(A) and 10(B), many narrow lubricating grooves 29 are formed in a direction parallel to the axis, thereby providing lower sliding resistance and easier insertion than the structure illustrated in FIGS. 9(A) and 9(B).

When, as illustrated in FIG. 1, the above-described sealing structure according to the present invention is provided toward the sealed fluid side (high pressure side) in a double sealing structure, back pressures do not increase, and the elastic seal 10 made of rubber provides excellent sealability even under low pressures. Therefore, as illustrated in FIG. 1, the second seal 12 preferably has low sliding resistance, and is preferably resistant to high pressures. However, the second seal 12 and the scraper 9 illustrated in FIG. 1 may be otherwise designed, and various other structures can be also used. The first seal in FIG. 1 can be replaced with the second seal 12 therein, and furthermore, the sealing structure in FIGS. 2-6 may be used as each of the first seal and the second seal.

Figure 11:
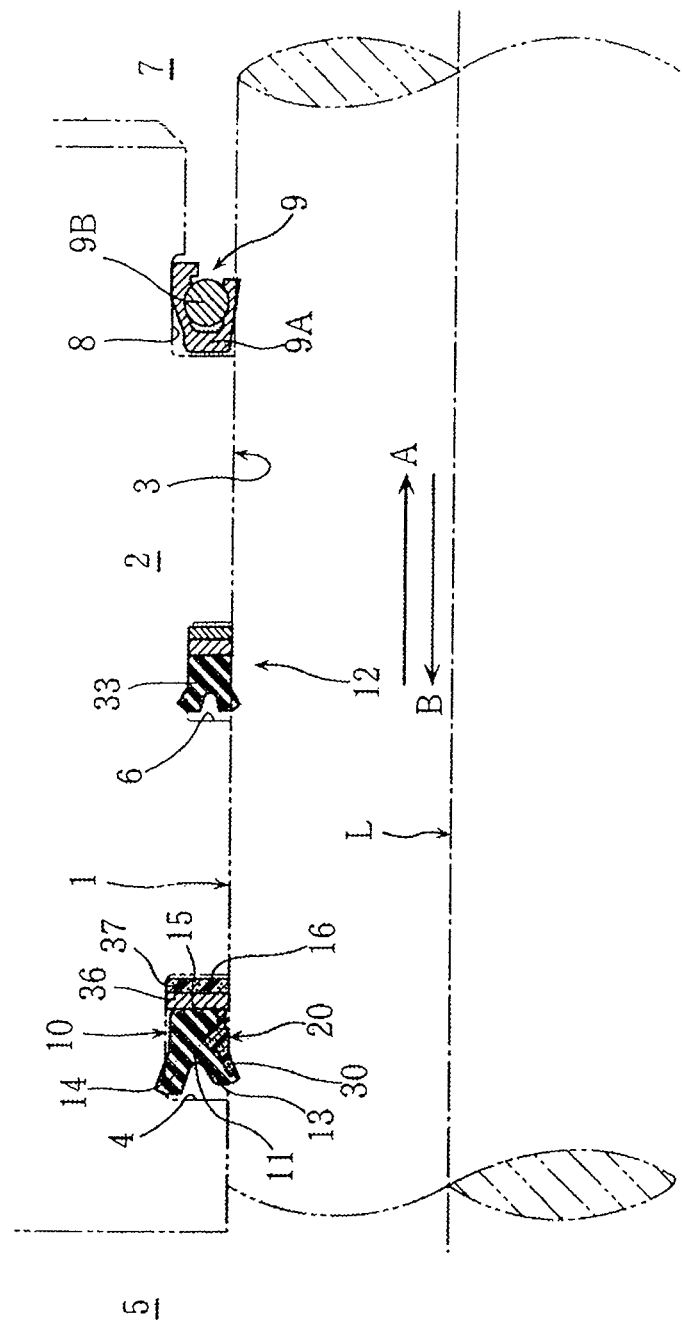
FIG. 11 is a diagram illustrating a cross section of a principal portion of a sealing structure according to another embodiment of the present invention.

Next, FIG. 11 illustrates another embodiment.

Figure 12:
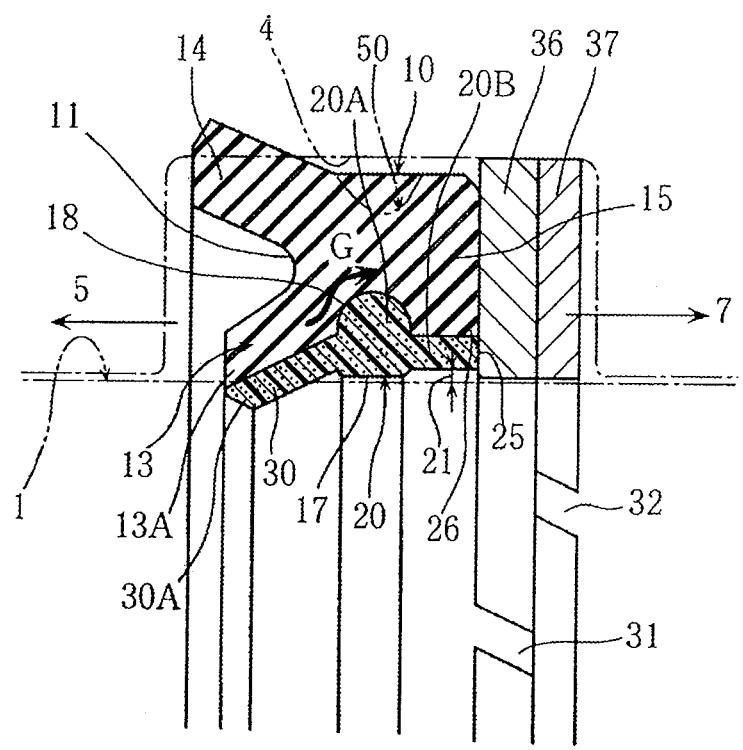
FIG. 12 is an enlarged cross-sectional view illustrating a principal portion of a first seal before insertion of the first seal.
Figure 13:
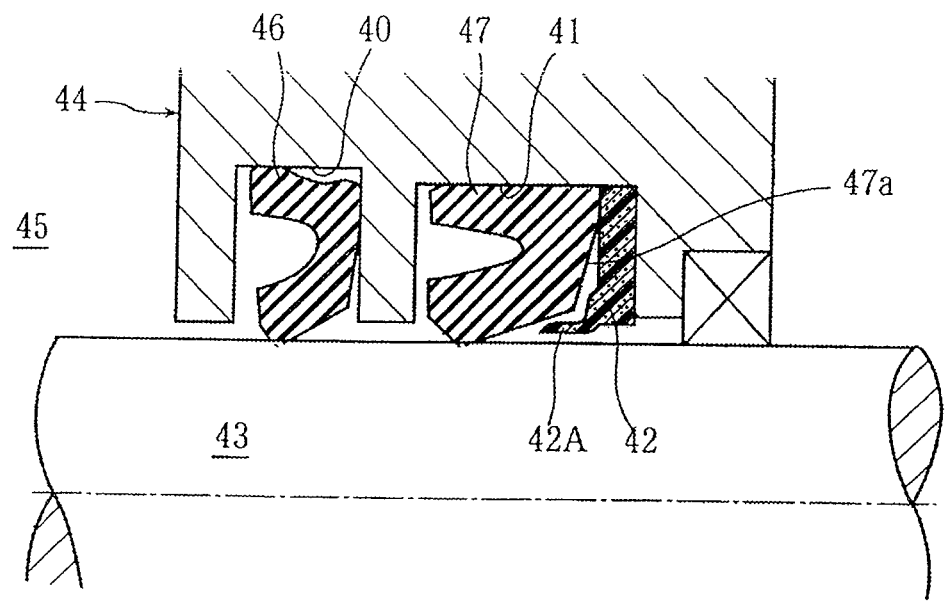
FIG. 13 is an enlarged cross-sectional view illustrating a principal portion of a sealing structure according to a conventional example.

In this embodiment, as illustrated in FIG. 12, the shape of a guide ring 20 of a sealing structure used as a first seal is different from that of the guide ring 20 of the sealing structure illustrated in FIG. 2. Specifically, the guide ring 20 integrally includes an inclined thin piece 30 tapered from a round V-shaped projecting portion 20A to the sealed fluid side (high pressure side) 5 along the inclined inner peripheral surface of an inside diameter lip 13 of an elastic seal 10.

The inclined thin piece 30 also covers the inner peripheral surface of an extreme distal end portion 13A of the inside diameter lip 13. Therefore, an extreme distal end portion 30A of the inclined thin piece 30 is in sliding contact with the rod 1 to provide a sealing effect. The inclined thin piece 30 made of synthetic resin, such as PTFE, is advantageous, because the inclined thin piece 30 has a low friction coefficient, is not in close contact with the surface of the rod 1 unlike rubber, and has low resistance to sliding of the rod. Such advantages are significant particularly in the application of high pressures, and thus, the sealing structure illustrated in FIG. 12 can be used under the conditions where higher pressures are used.

Backup rings 36 and 37 illustrated in FIG. 12 are different from the backup ring 16 illustrated in FIG. 2, etc., and are configured such that two vertically-oriented linear plate members which do not have an inclined guide surface 22 are laminated. While the guide ring 20 is shaped in an endless closed ring, the backup rings 36 and 37 have slits 31 and 32, respectively, formed by, e.g., bias cutting. The other components are similar to those in the embodiment described above with reference to FIGS. 2-6. Thus, the same reference characters are used to represent equivalent components, and description of such equivalent components is omitted.

Incidentally, the structure of a second seal 12 in FIG. 11 is different from that of the second seal 12 illustrated in FIG. 1. As illustrated in FIGS. 11 and 12, the inclined thin piece 30 made of synthetic resin is in sliding contact with the rod 1 to provide a sealing effect, and thus, the second seal 12 is more resistant also to high pressures than the structure illustrated in FIG. 1. On the other hand, under low pressures (under the conditions where low pressures are used), the inclined thin piece 30 made of synthetic resin applies low contact pressures to the rod 1, and thus, it is anticipated that a slight amount of fluid will leak. To address this problem, a sealing structure including a U seal (U gasket) 33 made of rubber, and backup rings is used as the second seal 12.

Figure 15:
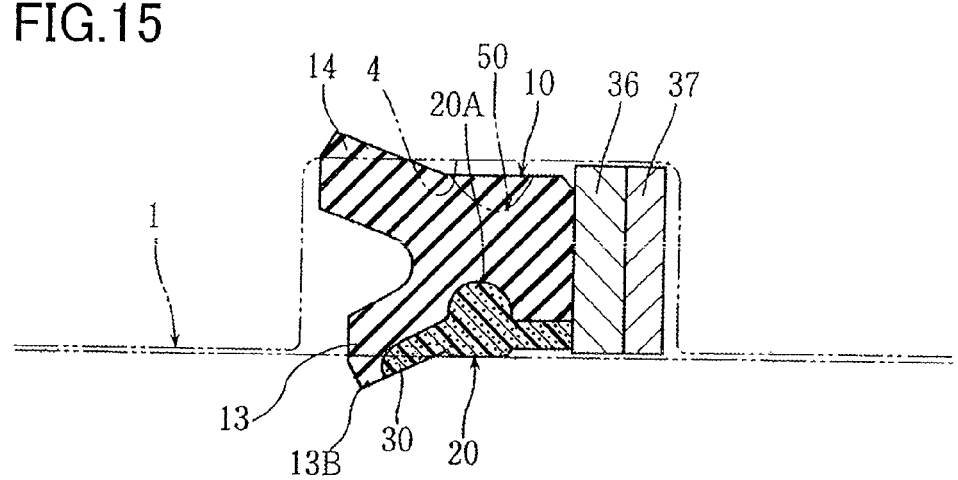
FIG. 15 is an enlarged view illustrating a principal portion of a sealing structure according to still another embodiment.
Figure 16:
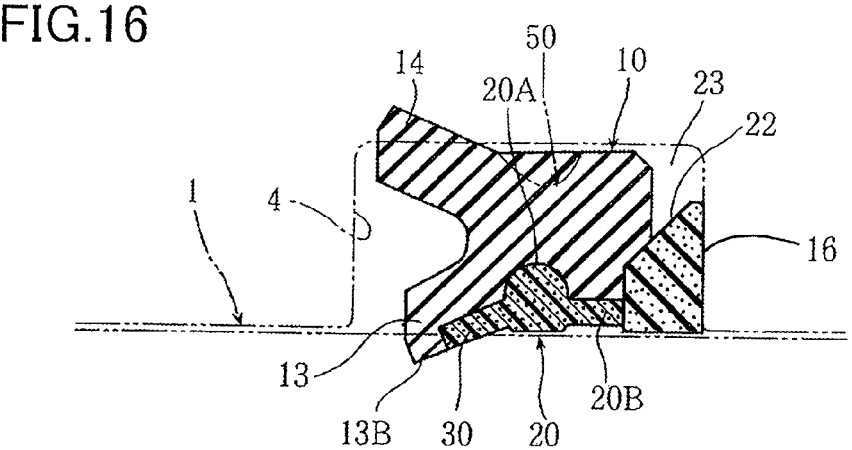
FIG. 16 is an enlarged cross-sectional view illustrating a principal portion of a sealing structure according to yet another embodiment.

Next, FIGS. 15 and 16 are enlarged cross-sectional views illustrating principal portions of sealing structures according to different embodiments before insertion of the sealing structures. In the structures illustrated in FIGS. 15 and 16, the longitudinal dimension of a tapered inclined thin piece 30 extending from a projecting portion 20A of a guide ring 20 is set shorter than that of the structure illustrated in FIG. 12. Specifically, the length of the inclined thin piece 30 is set short enough to prevent the inclined thin piece 30 from reaching a sealing distal end portion 13B of an inside diameter lip 13 of an elastic seal 10 which is in sliding contact with a reciprocating rod 1.

In the above-described structure illustrated in FIG. 12, the extreme distal end portion 30A of the guide ring 20 made of synthetic resin is in sliding contact with the rod 1. On the other hand, in the structure illustrated in each of FIGS. 15 and 16, the sealing distal end portion 13B (of the elastic seal 10) made of rubber is in sliding contact with the rod 1, thereby improving sealing performance. In other words, the structure illustrated in each of FIGS. 15 and 16 intermediately compensates for a slight imperfection in the above-described embodiments illustrated in FIGS. 2-4 and 12, can be used under high pressures, and reduces the resistance to sliding friction to a low level.

Incidentally, the example inclined thin piece 30 illustrated in each of FIGS. 11, 12, 15, and 16 may be tapered when it is connected integrally to the elastic seal 10 made of rubber. The inclined thin piece 30 may be configured such that as illustrated by the solid line in FIG. 17, a prospective inclined thin piece portion 30Z of a guide ring 20 is not tapered but is straight cylindrical before insertion of the guide ring 20, and is tapered as illustrated by the chain double-dashed line in FIG. 17 by being elastically energized in a direction of an arrow N in FIG. 17 by an elastic force of rubber under connection between the prospective inclined thin piece portion 30Z and the elastic seal 10 made of rubber. This facilitates fabrication.

Figure 17:
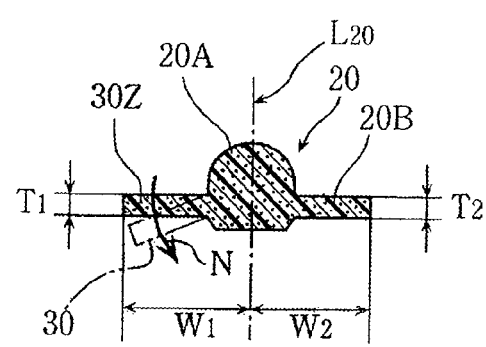
FIG. 17 is an enlarged cross-sectional view illustrating an example position of a guide ring before assembly.

Furthermore, the cross-sectional shape of the guide ring 20 illustrated by the solid line in FIG. 17 may be preferably symmetric with respect to the center line $L_{20}$ of the round V-shaped projecting portion 20A, and the dimension $W_1$ from the center line $L_{20}$ to the left end of the guide ring 20 may be preferably equal to the dimension $W_2$ from the center line $L_{20}$ to the right end thereof.

Specifically, the dimensions $W_1$ and $W_2$ are set equal to each other, and the thickness $T_2$ of the thin wall portion 20B is set equal to the thickness $T_1$ of the prospective inclined thin piece portion 30Z, thereby preventing errors in assembling the guide ring 20 to the elastic seal 10 made of rubber.

The inclined thin piece 30 is also preferably tapered before insertion of the guide ring 20.

In the cross section illustrated in each of FIGS. 12, 15, and 16 and FIGS. 18-21 described below, a small indentation 50 illustrated by the chain double-dashed line may be formed in the vicinity of the outer peripheral surface of a proximal portion of the outside diameter lip 14. In this case, the cross-sectional shape of the elastic seal 10 is U-shaped or Y-shaped.

Next, FIGS. 18-21 illustrate different other embodiments. The cross-sectional shape of an inside diameter lip 13 of an elastic seal 10 in each of these embodiments is different from that in each of the above-described embodiments. A high-pressure-side extreme distal end portion 13C of the elastic seal 10 in each of these embodiments is formed in a V shape in which the high-pressure-side extreme distal end portion 13C forms an acute angle. The angle $\beta$ is less than 90°, and is preferably greater than or equal to 50° and less than or equal to 85°.

As such, the high-pressure-side extreme distal end portion 13C is formed in a V shape forming an acute angle; therefore, under pressures, the pressures can be expected to be compensated for, thereby reducing the rod contact pressures (contact resistance) associated with radially inward pressures.

Figure 18:
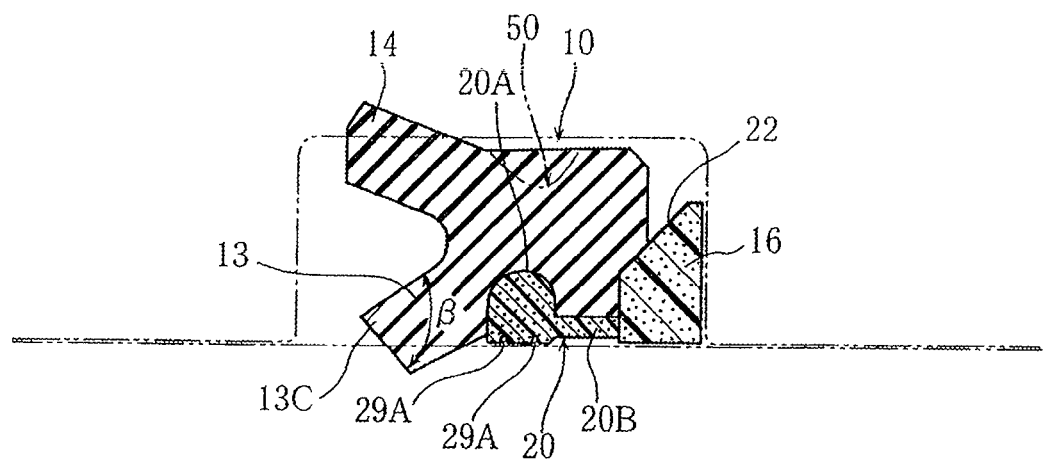
FIG. 18 is an enlarged cross-sectional view illustrating a principal portion of a sealing structure according to a variation.
Figure 19:
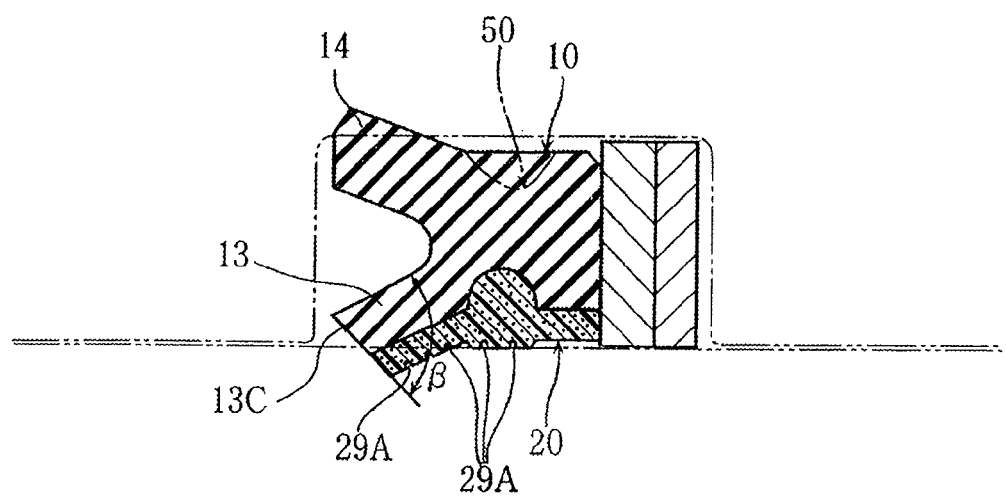
FIG. 19 is an enlarged cross-sectional view illustrating a principal portion of a sealing structure according to another variation.
Figure 20:
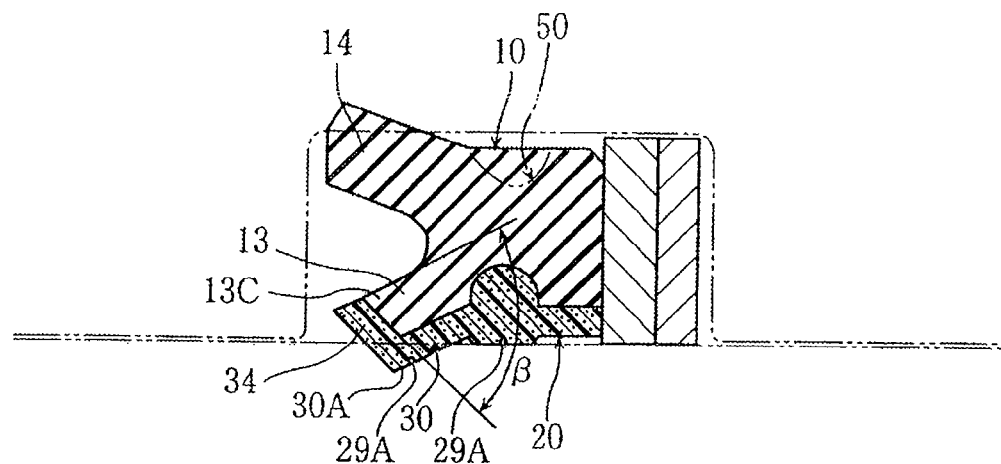
FIG. 20 is an enlarged cross-sectional view illustrating a principal portion of a sealing structure according to still another variation.
Figure 21:
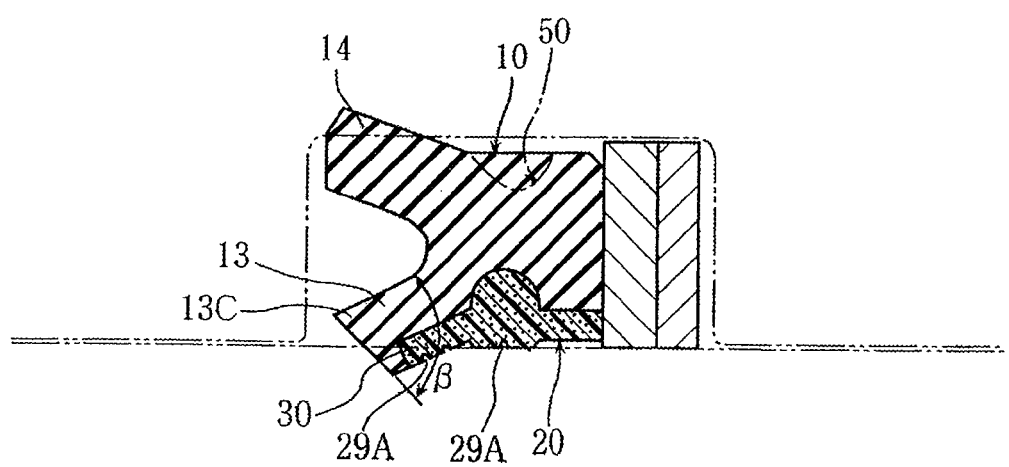
FIG. 21 is an enlarged cross-sectional view illustrating a principal portion of a sealing structure according to yet another variation.

A structure illustrated in FIG. 18 corresponds to a variation of the structure illustrated in FIGS. 2-4. A structure illustrated in FIG. 19 corresponds to a variation of the structure illustrated in FIG. 12. A structure illustrated in FIG. 21 corresponds to a variation of the structure illustrated in FIG. 15. In a structure illustrated in FIG. 20, a guide ring 20 has a unique cross-sectional shape, and has a high-pressure-side inversely tapered portion 34 inversely tapered from an extreme distal end portion 30A of an inclined thin piece 30.

Figure 8:
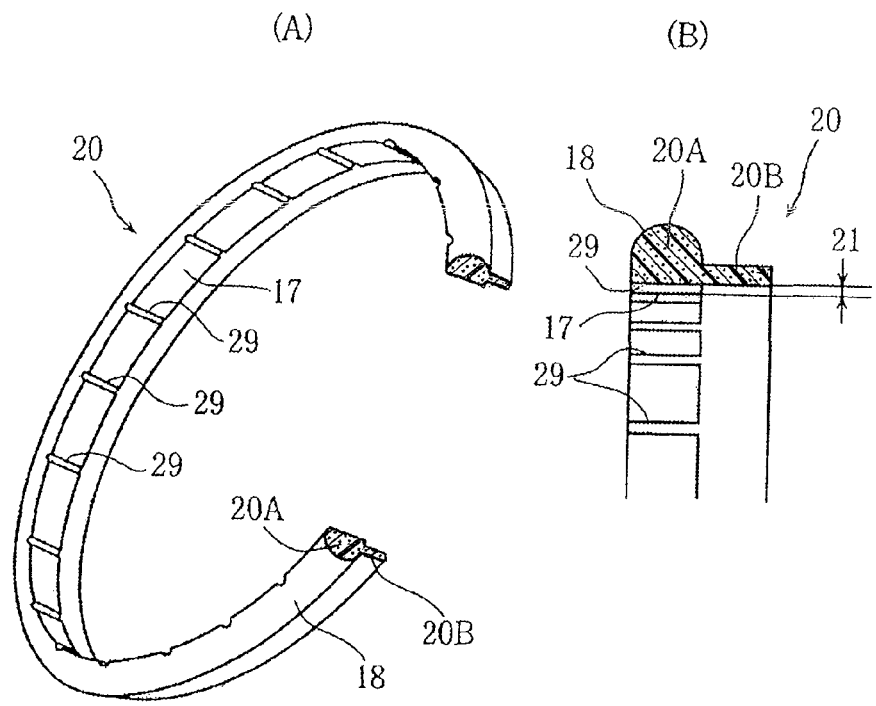
Figure 9:
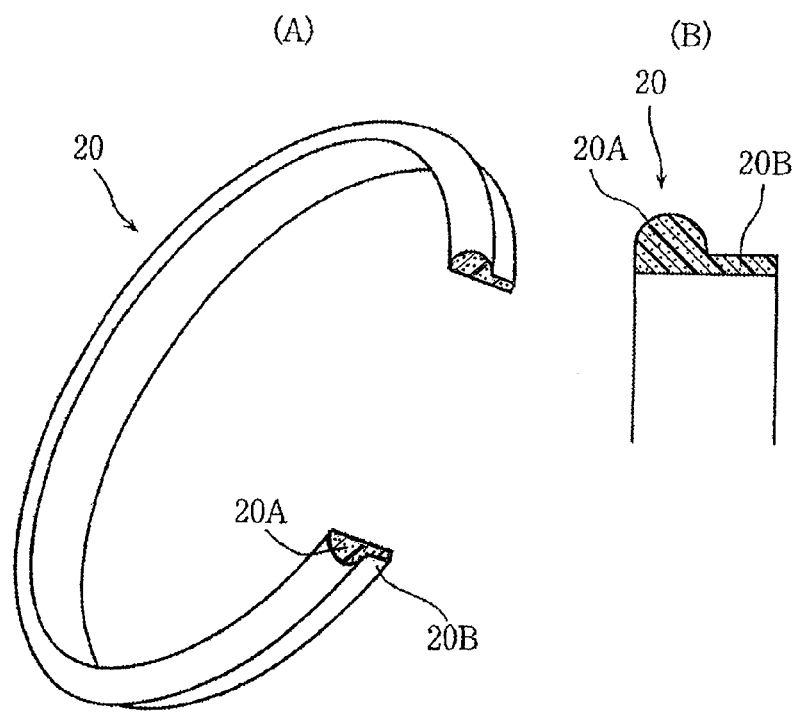
Figure 10:
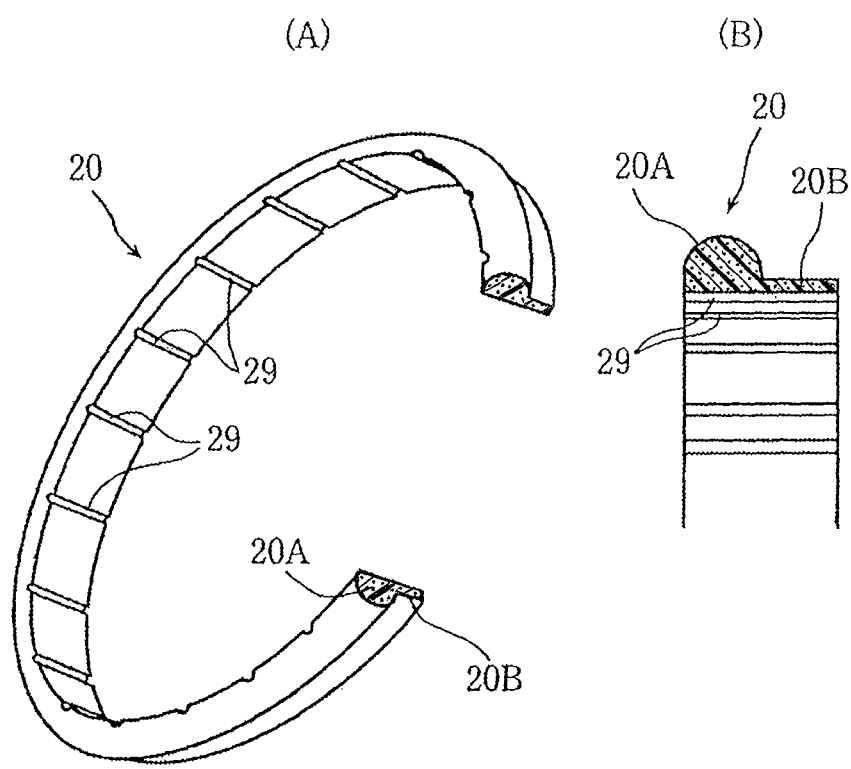

As illustrated in FIGS. 18-21, circumferentially extending narrow lubricating grooves 29A are preferably formed in the inner peripheral surface of a guide ring 20. The axially extending narrow lubricating grooves 29 illustrated in FIGS. 8 and 10 are preferably used for the structures illustrated in FIGS. 18, 15, and 16. However, the axially extending narrow lubricating grooves 29 are not preferably used for the structures illustrated in FIGS. 19 and 20, because seal paths are formed in the structures. However, the circumferentially extending narrow lubricating grooves 29A can be used in all of the embodiments.

Although not shown, even when the ratio of the axial dimension of a proximal portion of the elastic seal 10 of the present invention which is generally rectangular in cross section to the axial dimension of each of the inside diameter lip 13 and the outside diameter lip 14 to which the elastic seal 10 branches to be open to the high pressure side is higher than that in each of the illustrated examples described above, the above-described structures of the present invention can be used.

Figure 22:
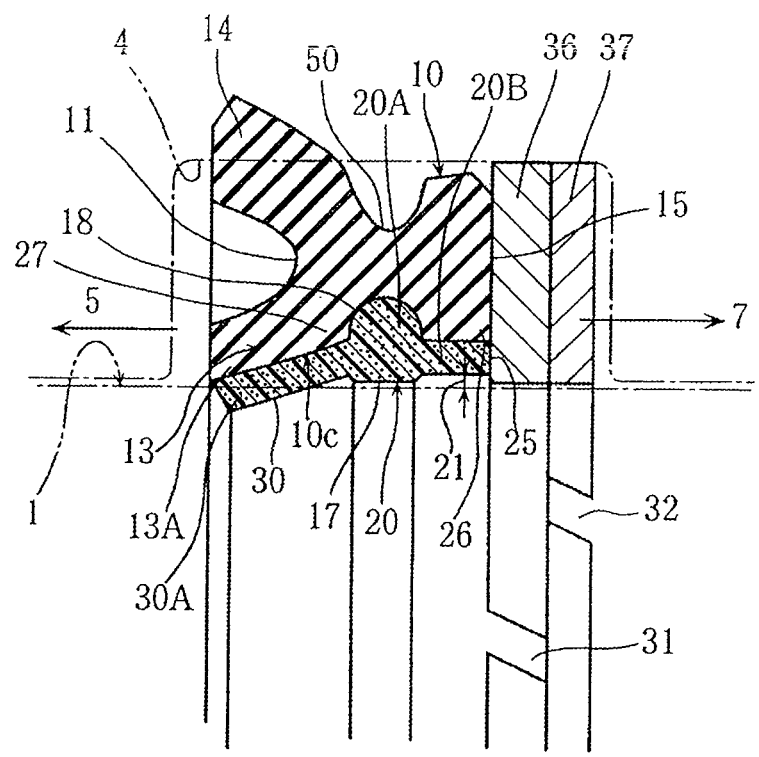
FIG. 22 is an enlarged cross-sectional view illustrating a principal portion of a sealing structure according to a further embodiment of the present invention.

Next, in a further embodiment illustrated in FIG. 22, an elastic seal 10 is a Y seal having a Y-shaped cross-section, and has an outside diameter lip 14 having a sufficiently large cross-sectional area, and a small indentation 50 is formed such that the wall of the small indentation 50 is smoothly continuous with the outer peripheral surface of the outside diameter lip 14.

As described above, the sealing structure of the present invention is obtained by combining rubber and synthetic resin together, and is used for a structure through which a rod 1 reciprocates. The sealing structure of the present invention is resistant to the use of high pressures, exhibits sufficient sealing performance even under low pressures, and preferably has a double sealing structure for high pressure applications. The sealing structure of the present invention is preferably a structure used at the high pressure side (see FIGS. 1 and 11), and otherwise can be used at the low pressure side (as the second seal) or at each of the high pressure side and the low pressure side.

Even when the recess 4 for sealing is ring-shaped, the elastic seal 10 can be easily inserted into the recess 4, and the inside diameter lip 13 of rubber allows the elastic seal 10 to provide excellent sealing performance (sealability) under low to high pressures (see FIGS. 1-4). Additionally, the sealing structure of the present invention is an excellent invention, because the sealing structure can ensure the prevention of conventional engagement 49 illustrated in FIG. 14 and excessively high contact pressures as illustrated by the arrows $f_1$ and $f_2$, can reduce abrasion resistance and resistance to sliding of the rod, and has a long life without wear and failure of rubber.

In particular, the sealing structure of the present invention is configured such that the rubber flow is guided by the round V-shaped projecting portion 20A of synthetic resin as illustrated by the arrow G in each of FIGS. 4 and 12, thereby ingeniously preventing the inside diameter lip 13 from being in close contact with the rod surface under high pressures.

Since the backup rings 16, 36, and 37 each have a slit 31 formed by, e.g., bias cutting, such a backup ring is easily inserted into a ring-shaped groove. Furthermore, since the guide ring 20 is formed in a flat shape having a small radial dimension, has low rigidity, and thus, tends to be elastically deformed, the guide ring 20 is easily inserted into a ring-shaped groove. Moreover, since the elastic seal 10 having a U-shaped or Y-shaped cross-section is made of rubber which can be elastically deformed, the elastic seal 10 is clearly easily inserted. Since the round V-shaped projecting portion 20A of the flat and small guide ring 20 is fitted into the small recess 19 of the elastic seal 10 made of rubber, the elastic seal 10 and the guide ring 20 can be expected to move together, and easier insertion of the guide ring 20 can be achieved without crushing the guide ring 20 or causing the guide ring 20 to fall off. Since, in the present invention, back pressures do not increase, the sealing structure of the present invention may be used for a double sealing structure.

As illustrated by the solid line in FIG. 22 and by the chain double-dashed line in each of FIGS. 2, 5, 12, 15, 16, and 18-21, a small indentation 50 (when viewed in cross section), i.e., a small circumferential groove, is formed, thereby providing the following operational advantages.

(i) When high pressures are applied to the sealed fluid side 5, the outside diameter lip 14 of the U-shaped or Y-shaped elastic seal 10 enters the indentation 50 while moving to the low pressure side 7 along the circumferential wall of the recess 4, and is strongly pressed against the groove circumferential surface (high contact pressures are generated), thereby preventing fluid from leaking out by operation of so-called squeeze seal.

(ii) In the example double sealing structures illustrated in FIGS. 1 and 11, pressures (so-called back pressures) against the back surface 15 of the elastic seal 10 do not increase. In these structures, back pressures seem to increase by the above-described operation of squeeze seal. However, as soon as the back pressures have been slightly higher than pressures at the high pressure side 5, a rubber material entering the small indentation 50 is pushed back, and thus, the back pressures are expected to be removed.

As described above, a sealing structure of the present invention includes an elastic seal 10 inserted into a recess 4 formed in the inner circumferential surface of a bore 3 through which a reciprocating rod 1 is inserted, having an inside diameter lip 13 and an outside diameter lip 14, and made of rubber, and a backup ring 16, 36, 37 for supporting the back surface 15 of the elastic seal 10. The sealing structure includes a guide ring 20 made of synthetic resin, and the guide ring 20 includes a thin wall portion 20B having a low-pressure-side end portion 25 which is in contact with the backup ring 16, and supporting the seal inner peripheral surface 10C of the elastic seal 10 toward the back surface 15, and a round V-shaped projecting portion 20A connected to the thin wall portion 20B, and fitted into a small recess 19 formed in an axially central portion of the seal inner peripheral surface 10C. Since the sealing structure of the present invention is configured such that under pressures, rubber in a surrounding region 27 of a proximal portion of the inside diameter lip 13 of the elastic seal 10 is guided radially outward by the round V-shaped projecting portion 20A, this allows achievement of the intended object, advantageously prevents the inside diameter lip 13 made of rubber from being pressed against the rod 1 with excessively high contact pressures under high pressures, reduces abrasion resistance to allow a reduction in the resistance to sliding of the rod, and can also prevent early wear in the inside diameter lip 13 made of rubber. In addition, the inside diameter lip 13 made of rubber provides a sealing effect, and thus, excellent sealability is provided even under low pressures. Furthermore, engagement (see the reference character 49 in FIG. 14) of an inner corner portion of the elastic seal 10 made of rubber and located near the back surface 15 thereof can be also reliably prevented, and a reduction in the resistance to sliding of the guide ring 20 made of synthetic resin and being in sliding contact with the rod 1 can be ensured.

Furthermore, since the sealing structure of the present invention can be easily inserted into a ring-shaped groove, and back pressures do not increase, the sealing structure is suitable for a double sealing structure.

The elastic seal 10 has a U-shaped or Y-shaped cross section, and is configured such that a small indentation 50 is formed in the vicinity of the outer circumferential surface of a proximal portion of the outside diameter lip 14, and thus, when high pressures are applied to the sealed fluid side 5, the outside diameter lip 14 of the U-shaped or Y-shaped elastic seal 10 enters the indentation 50 while moving to the low pressure side 7 along the circumferential wall of the recess 4, and is strongly pressed against the groove circumferential wall (high contact pressures are generated), thereby preventing fluid from leaking out by operation of so-called squeeze seal. Additionally, in the example double sealing structures illustrated in FIGS. 1 and 11, pressures (so-called back pressures) against the back surface 15 of the elastic seal 10 do not increase. The reason for this is as follows: back pressures seem to be increased by the above-described operation of squeeze seal; however, as soon as the back pressures have been slightly higher than pressures at the high pressure side 5, a rubber material entering the small indentation 50 is pushed back, and thus, the back pressures can be expected to be removed.

Since the guide ring 20 integrally includes an inclined thin piece 30 tapered from the projecting portion 20A to the sealed fluid side 5 along the inner peripheral surface of the inside diameter lip 13 of the elastic seal 10, the guide ring 20 is resistant to the conditions where higher pressures are used. Specifically, since the inside diameter lip 13 made of rubber is supported by the inclined thin piece 30 made of synthetic resin from the inside diameter side, this prevents rubber from being excessively deformed, and since the inclined thin piece 30 made of synthetic resin is in sliding contact with the rod 1, this prevents the inside diameter lip 13 from being in close contact with the surface of the rod 1, and also reduces the resistance to sliding of the rod to a low level.

The backup ring 16 has an outer circumferential end surface including an inclined guide surface 22 formed such that the diameter of the inclined guide surface 22 increases toward the low pressure side 7, and under pressures, the rubber 24 forming a back proximal portion of the elastic seal 10 is guided radially outward and toward the low pressure side 7; therefore, as illustrated by the arrows J and K in FIG. 4, rubber is deformed, and enters the space 23. This prevents excessively high contact pressures from being applied from the inside diameter lip 13 to the rod 1, prevents early wear in the inside diameter lip 13, and reduces the resistance to sliding of the rod.

Since the recess 4 is ring-shaped, and the guide ring 20 is shaped in an endless closed ring, this can contribute to a size and weight reduction of hydraulic devices, etc., and can also provide sufficiently satisfactory sealing performance.

In a double sealing structure, a sealing structure of the present invention is disposed toward each of the sealed fluid side and the low pressure side, and the double sealing structure can be used also under the conditions where higher pressures are used.

INDUSTRIAL APPLICABILITY

The present invention is useful for a sealing structure and a double sealing structure using the same.

DESCRIPTION OF REFERENCE CHARACTERS 1 (Reciprocating) Rod
3 Bore
4 Recess
5 High Pressure Side (Sealed Fluid Side)
7 Low Pressure Side
10 Elastic Seal
10C Seal Inner Peripheral Surface
13 Inside Diameter Lip
14 Outside Diameter Lip
15 Back Surface
16, 36, 37 Backup Ring
19 Small Recess
20 Guide Ring
20A Projecting Portion
20B Thin Wall Portion
22 Inclined Guide Surface
24 Rubber of Back Proximal Portion
25 Low-Pressure-Side End Portion
26 Inner Corner Portion
27 Surrounding Region of Proximal Portion
30 Inclined Thin Piece
50 Indentation

The invention claimed is:
1. A sealing structure, comprising:
an annular elastic seal made of rubber and having an inner diameter and an outer diameter, the seal insertable into a recess formed in an inner peripheral surface of a bore through which a reciprocating rod is inserted; and
a backup ring configured to support a first surface of the elastic seal, wherein
a portion of the elastic seal distal from the first surface of the elastic seal includes an inside diameter lip arranged on the inner diameter of the seal and an outside diameter lip arranged on the outside diameter of the seal, the sealing structure further includes a guide ring having a first axial end and a second axial end, the guide ring provided adjacent an inner circumferential surface of the elastic seal, made of synthetic resin, and integrally including a thin wall portion proximate to the second axial end of the guide ring, the thinwall portion having a first end portion being in contact with the backup ring, and which is configured to support a seal inner peripheral surface of the elastic seal toward the first surface of the elastic seal, and a projecting portion having a semi-circular cross-section proximate to the first axial end of the guide ring and connected to the thin wall portion, fitted into a recess formed in an axially central portion of the seal inner peripheral surface, a thickness of the thin wall portion being different from a thickness of the projecting portion, and having a round V-shaped cross section, wherein the thinwall portion is disposed radially outward from a cylindrical surface of the inner diameter of the guide ring, the projecting portion to form a space between the thinwall portion and the reciprocating rod, an outer peripheral surface of the backup ring includes an inclined guide surface formed such that a diameter of the backup ring gradually increases toward a back surface of the backup ring, a space is formed in a corner portion of the recess located toward the back surface of the backup ring, the space defined by the inner peripheral surface of the bore, a portion of the elastic seal, and a portion of the inclined guide surface, and under pressures, rubber in a surrounding region of a proximal portion of the inside diameter lip of the elastic seal is guided radially outward by the projecting portion, and a portion of the rubber forming the elastic seal is guided into the space along the inclined guide surface.

2. The sealing structure of claim 1, wherein the elastic seal is a U seal having a U-shaped cross section.

3. The sealing structure of claim 1, wherein the elastic seal is a Y seal having a Y-shaped cross section.

4. The sealing structure of claim 1, wherein the elastic seal has a U-shaped or Y-shaped cross section, and a small indentation is formed near an outer circumferential surface of a proximal portion of the outside diameter lip.

5. The sealing structure of claim 1, wherein the backup ring has an outer circumferential end surface including an inclined guide surface formed such that a diameter of the inclined guide surface increases toward a low pressure side, and under pressures, rubber forming a back proximal portion of the elastic seal is guided radially outward and toward the low pressure side.

6. The sealing structure of claim 1, wherein the recess is ring-shaped, and the guide ring is shaped in an endless closed ring.

7. A double sealing structure, comprising:
the sealing structure of claim 1 disposed toward at least one of a sealed fluid side or a low pressure side.

8. A sealing structure, comprising:
an annular elastic seal made of rubber and having an inner diameter and an outer diameter, the seal insertable into a recess formed in an inner peripheral surface of a bore through which a reciprocating rod is inserted; and a backup ring configured to support a first surface of the elastic seal, wherein a portion of the elastic seal distal from the first surface of the elastic seal includes an inside diameter lip arranged on the inner diameter of the seal and an outside diameter lip arranged on the outer diameter of the seal, the sealing structure further includes a guide ring having a first axial end and a second axial end, the guide ring provided adjacent an inner circumferential surface of the elastic seal, made of synthetic resin, and integrally including a thin wall portion proximate to the second axial end of the guide ring, the thinwall portion having a first end portion being in contact with the backup ring, and which is configured to support a seal inner peripheral surface of the elastic seal toward the first surface of the elastic seal, and a projecting portion having a semi-circular cross-section proximate to the first axial end of the guide ring and connected to the thin wall portion, fitted into a recess formed in an axially central portion of the seal inner peripheral surface, a thickness of the thin wall portion being different from a thickness of the projecting portion, and having a round V-shaped cross section, wherein the thinwall portion is disposed radially outward from a planar surface of the projecting portion to form a space between the thinwall portion and the reciprocating rod, and under pressures, rubber in a surrounding region of a proximal portion of the inside diameter lip of the elastic seal is guided radially outward by the projecting portion.

9. A sealing structure, comprising:
an annular elastic seal made of rubber and having an inner diameter and an outer diameter, the seal insertable into a recess formed in an inner peripheral surface of a bore through which a reciprocating rod is inserted; and a backup ring configured to support a first surface of the elastic seal, wherein a portion of the elastic seal distal from the first surface of the elastic seal includes an inside diameter lip arranged on the inner diameter of the seal and an outside diameter lip arranged on the outer diameter of the seal, the sealing structure further includes a guide ring having a first axial end and a second axial end of the guide ring provided adjacent an inner circumferential surface of the elastic seal, made of synthetic resin, and integrally including a thin wall portion proximate to the second axial end of the guide ring the thinwall portion having a first end portion being in contact with the backup ring, and which is configured to support a seal inner peripheral surface of the elastic seal toward the first surface of the elastic seal, and a projecting portion having a semi-circular cross-section proximate to the first axial end of the guide ring and connected to the thin wall portion, fitted into a small recess formed in an axially central portion of the seal inner peripheral surface, a thickness of the thin wall portion being different from a thickness of the projecting portion, and having a round V-shaped cross section, wherein the thinwall portion is disposed radially outward from a cylindrical surface of the inner diameter of the guide ring, the projecting portion to form a space between the thinwall portion and the reciprocating rod, and under pressures, rubber in a surrounding region of a proximal portion of the inside diameter lip of the elastic seal is guided radially outward by the projecting portion, wherein the backup ring has an outer circumferential end surface including an inclined guide surface formed such that a diameter of the inclined guide surface increases toward a low pressure side, and under pressures, rubber forming a back proximal portion of the elastic seal is guided radially outward and toward the low pressure side.

10. The sealing structure of claim 1 wherein
the guide ring integrally includes an inclined thin piece tapered from the projecting portion to a sealed fluid side along an inner peripheral surface of the inside diameter lip of the elastic seal.

* * * * *